US011273575B2

(12) United States Patent
Roberts et al.

(10) Patent No.: US 11,273,575 B2
(45) Date of Patent: Mar. 15, 2022

(54) ECCENTRIC BUILDUP DETECTION IN CONCRETE DRUMS

(71) Applicant: VERIFI LLC, Cambridge, MA (US)

(72) Inventors: Mark F. Roberts, North Andover, MA (US); Yan Glina, Medford, MA (US); Richard K. Jordan, Littleton, MA (US); Gregory A. Goldstein, Somerville, MA (US); Howard Livingston, Winter Haven, FL (US); Nathan A. Tregger, Northborough, MA (US)

(73) Assignee: Verifi LLC, Cambridge, MA (US)

( * ) Notice: Subject to any disclaimer, the term of this patent is extended or adjusted under 35 U.S.C. 154(b) by 598 days.

(21) Appl. No.: 16/093,641

(22) PCT Filed: Apr. 11, 2017

(86) PCT No.: PCT/US2017/027011
§ 371 (c)(1),
(2) Date: Oct. 14, 2018

(87) PCT Pub. No.: WO2017/180625
PCT Pub. Date: Oct. 19, 2017

(65) Prior Publication Data
US 2019/0126510 A1    May 2, 2019

Related U.S. Application Data

(60) Provisional application No. 62/323,273, filed on Apr. 15, 2016.

(51) Int. Cl.
*B28C 7/00* (2006.01)
*B28C 7/02* (2006.01)
*B28C 5/42* (2006.01)

(52) U.S. Cl.
CPC .............. *B28C 7/026* (2013.01); *B28C 5/422* (2013.01)

(58) Field of Classification Search
CPC ................................ B28C 7/026; B28C 7/022
See application file for complete search history.

(56) References Cited

U.S. PATENT DOCUMENTS 3,463,462 A    8/1969    Sarff et al.
7,510,319 B2   3/2009    Hood
(Continued)

OTHER PUBLICATIONS

Copenheaver, Form PCT/ISA/210, International Search Report for PCT/US2017/027011, dated Jun. 26, 2017, 2 pages.
(Continued)

*Primary Examiner* — Anshu Bhatia
(74) *Attorney, Agent, or Firm* — Craig K. Leon

(57) ABSTRACT

The present invention provides a method and system for detecting hardened concrete buildup in a mixer drum which is substantially devoid of plastic concrete. An exemplary method involves monitoring the hydraulic pressure required to rotate the drum through at least two successive rotations at constant speed, using a hydraulic pressure sensor on hydraulic charge side, discharge side, or preferably both sides of the hydraulic motor which turns the mixer drum; and detecting when the pressure/time data curve indicates eccentric behavior of the mixer drum, whereby an alarm or other indication is provided to confirm that the hardened concrete buildup in the truck is not acceptable. The buildup detection method and system of the present invention does not require the use of an automated slump monitoring system, but can be implemented in combination with such systems with favorable results and advantages.

17 Claims, 7 Drawing Sheets

(56) References Cited

U.S. PATENT DOCUMENTS

| | | | |
|---|---|---|---|
| 8,118,473 B2 | 2/2012 | Compton et al. | |
| 8,818,561 B2 | 8/2014 | Koehler et al. | |
| 8,926,164 B2 * | 1/2015 | Kamijo | B28C 5/4231 |
| | | | 366/61 |
| 8,960,990 B2 | 2/2015 | Koehler et al. | |
| 2009/0171595 A1 * | 7/2009 | Bonilla Benegas | B28C 7/02 |
| | | | 702/41 |
| 2011/0004333 A1 | 1/2011 | Anderson | |
| 2014/0104066 A1 * | 4/2014 | Jordan | B28C 5/4231 |
| | | | 340/606 |

OTHER PUBLICATIONS

Copenheaver, Form PCT/ISA/237, Written Opinion of the International Searching Authority for PCT/US2017/027011, dated Jun. 26, 2017, 6 pages.

* cited by examiner

ECCENTRIC BUILDUP DETECTION IN CONCRETE DRUMS

FIELD OF THE INVENTION

The present invention relates to concrete mixing, and, more particularly, to a novel method and system for detecting hardened concrete buildup within the mixer drum of a concrete delivery vehicle based upon eccentric behavior of an empty drum.

BACKGROUND OF THE INVENTION

The present inventors believe that concrete which hardens inside a concrete mixer drum (hereinafter "buildup") can adversely affect the production and delivery of concrete in numerous and often inter-related ways.

In the first instance, the hardened concrete means extra weight on the truck. This extra weight can lead to lower fuel efficiency during transportation as well as give rise to increased energy consumption for rotating the mixer drum. This extra weight also reduces the operational safety of the vehicle because it can throw the truck off balance during a turn or at various other points of transit. In extreme cases, the truck can turn over causing serious injuries or fatalities.

The present inventors believe that the hardened concrete buildup can also reduce volume capacity within mixer drums, leading to a reduction in mixing and loading efficiency, because loading and batching times could be unnecessarily prolonged.

Decreased mixing efficiency could also lead to mixing of a concrete load that is non-homogeneous in nature. If non-homogeneous, the concrete mix could have quality issues at the construction site especially in terms of slump and strength.

The present inventors further believe that hardened concrete buildup within the mixer drum is not easily detectable by the truck driver or plant foreman during the batching and delivery operations. It is often the case that the largest buildup of hardened concrete is located in the belly portion of the mixer drum, and, hence, out of the line of sight. Even after hardened concrete is "chipped out" of the drum, the hardened concrete can quickly build-up again within a matter of days. In many plants, truck drivers are instructed to park their trucks with the drum label in a position which advertises the company brand. Since the drum is held in the same position, the plastic concrete remaining in the drum tends to settle into the drum belly and accumulate at the same place time after time, creating buildup quickly.

The process of "chipping out" hardened concrete buildup in the delivery trucks is dangerous. This operation requires that workers climb into the drum with jack-hammers to remove the accumulated buildup which may be located at various circumferential places around the interior of the drum, such as on or along mixing blades that are spirally mounted to around the rotational axis of the drum. The risk of injury is perhaps proportional to the amount of buildup within the drum, particularly where chunks of hardened concrete, hanging over the head or limbs of a worker, become easily dislodged by jack-hammer operation.

Previous attempts to resolve the problem of concrete buildup have not provided sufficient accuracy with respect to determining how much buildup has occurred and when to address the buildup problem. For example, in U.S. Pat. No. 8,960,990 (owned by the common assignee hereof), Koehler et al. taught that the hydraulic pressure required to rotate the concrete mixer drum of a delivery truck could be used to monitor and to analyze plastic concrete as it flowed over the blades within the rotating drum belly. The waveform of energy could be analyzed as the plastic flowed over the rotating blades within the drum, by using a large number of sampling rates per drum rotation.

The present inventors, on the other hand, believe that buildup cannot be addressed with desired accuracy by wet concrete monitoring. Part of the problem is that once a wet concrete load is batched into the drum, the first priority of the driver is to deliver it to the customer. It is unlikely that the driver will stop the delivery to clean out a truck after it has been freshly loaded with plastic concrete. Another problem is that, once the load of plastic concrete is batched into the drum, the presence of hardened buildup can be masked by the increase of the weight on the drum.

Hence, a novel method and system for detecting and measuring hardened concrete buildup in the mixer drum of a concrete delivery vehicle is desperately needed.

SUMMARY OF THE INVENTION

In surmounting the disadvantages of prior art approaches, the present invention provides a method and system for detecting hardened concrete buildup within a concrete mixer drum of a concrete delivery truck which is substantially devoid (or empty) of plastic concrete.

The present invention involves, in other words, an analysis of the eccentricity of a rotatable concrete mixer drum when it is in a substantially empty state. The present inventors describe this empty state, wherein the mixer drum has a "zero or negligible load," in quantitative terms, as follows: when the drum contains 0 to 1.0 (and more preferably 0-0.5) cubic yards of loose material comprising plastic cementitious material or other material that is not attached to the mixer drum and thus not moving within the drum upon rotation of the drum.

There should be a minimal and more preferably zero amount of any returned plastic concrete (e.g., after delivery) or any other loose material, such as aggregate (stone) or other loose hardened concrete pieces in the mixer drum for the present invention to work.

An exemplary method of the present invention for detecting buildup of hardened concrete in a mixer drum, comprises: (a) providing a rotatable concrete mixer drum having an inner wall and at least two blades mounted on the inner wall within the mixer drum, the mixer drum having 0.0-1.0 (and more preferably 0.0-0.5) cubic yard of plastic cementitious material and material unattached to the mixer drum (hereinafter described as "mixer drum having zero or negligible load"), the concrete mixer drum having zero or negligible load being rotated at a constant rotational speed by a motor driven by a hydraulic-pressure pump, the motor having a first side for charging the motor in a first direction using hydraulic fluid driven by the pump and a second side for returning the hydraulic fluid to the pump; (b) measuring the hydraulic pressure as a function of time during at least two successive complete rotations (e.g., ≥720 degrees of rotation) of the mixer drum having zero or negligible load at constant rotational speed (which rotational speed is preferably <1.0 RPM, and more preferably <0.5 RPM) using a sensor for measuring the pressure of the hydraulic fluid at the first side, using a sensor for measuring pressure of the hydraulic fluid at the second side, or sensors on both sides, thereby to obtain a pressure/time data curve (corresponding to the energy required to rotate the drum through successive rotations); (c) determining when the sensed pressure/time data curve as obtained from step (b) displays eccentric behavior which meets or exceeds a stored eccentricity threshold; and, where eccentric behavior meets or exceeds a stored eccentricity threshold value or limit; (d) providing an alarm or indication that the mixer drum has attained or exceeded the stored eccentricity threshold.

At least 2, and, more preferably, at least 10-20 or more successive rotations of the concrete mixer drum should be completed so that the obtained pressure/time data curve does not reflect only spurious phenomena (e.g., truck driving over a hole or bumpy terrain which distorts accuracy of hydraulic pressure monitoring on the delivery truck).

An exemplary system of the present invention comprises a processor unit which is programmed to perform the method steps described above for monitoring a concrete mixer drum on delivery truck which is substantially devoid of concrete, at least one and preferably two hydraulic pressure sensors communicative with the processor unit and effective to communicate hydraulic pressure values on the charge side, discharge side, or both sides of a hydraulic pressure motor employed for rotating the mixer drum using a hydraulic pressure pump; and at least one sensor for detecting rotational speed of the concrete mixer drum; the processor being communicative with accessible memory location which stores one or more pre-established eccentric threshold values for determining when hardened concrete buildup in the mixer drum has attained an unacceptable eccentricity state; and an alarm, monitor, or other indication means for signaling to the driver, system operator, foreman, or other persons that eccentricity (buildup) threshold has been met or exceeded.

Other advantages and features of the invention will be described in further detail hereinafter.

BRIEF DESCRIPTION OF DRAWINGS

An appreciation of the benefits and features of the invention may be more readily comprehended through consideration of the following written description of preferred embodiments in conjunction with the drawings, wherein.

DETAILED DESCRIPTION OF PREFERRED EMBODIMENTS

Figure 1:
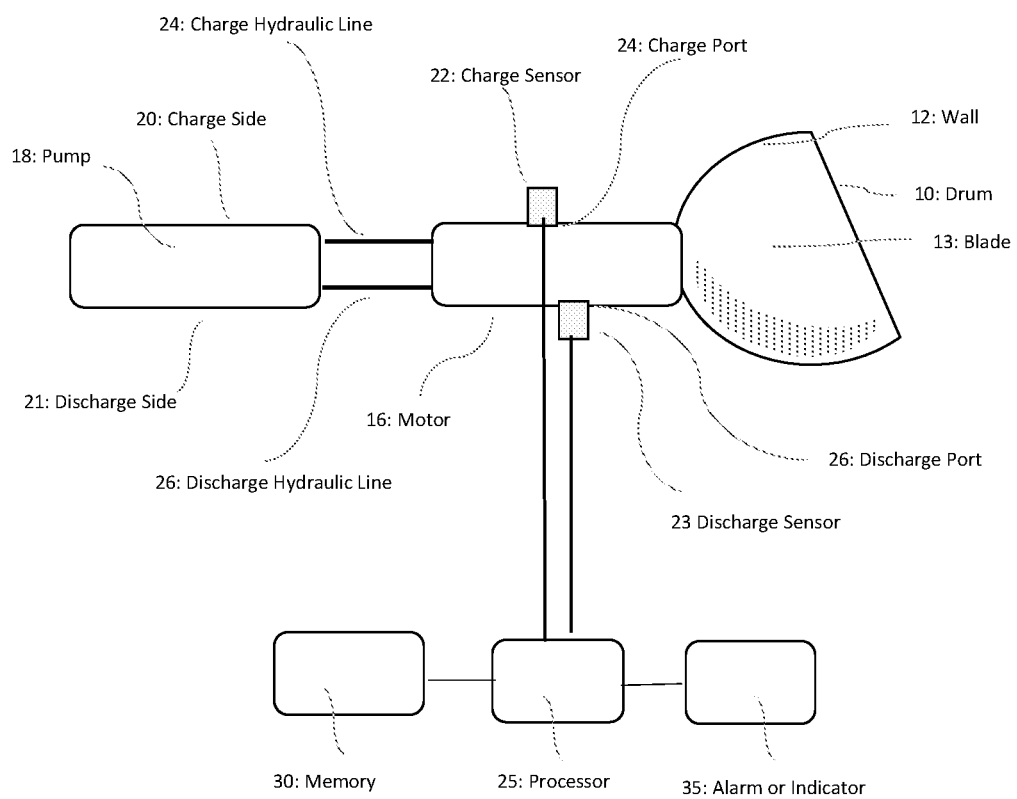
FIG. 1 is a block diagram of exemplary system of the present invention wherein a hydraulic pressure pump is used to drive a motor which rotates a concrete mixer drum that is substantially devoid of plastic concrete, and the hydraulic pressure(s) on the charge side, discharge side, or both charge and discharge sides, is/are monitored over time and successive drum rotations by one or more pressure sensors which communicate to a processor unit programmed to determine when eccentricity of mixer drum behavior meets or exceeds a stored eccentricity threshold value (or limit), and actuating an alarm or other indication when the eccentricity threshold value is determined by the processor to have been met or exceeded.

The present invention now will be described more fully hereinafter with reference to the accompanying drawings, in which various exemplary embodiments are shown illustrating variations within the scope of the invention. This disclosure may, however, be embodied in many different forms and should not be construed as limited to the embodiments described and/or shown herein. These embodiments are provided to enable this disclosure to be complete and thorough, and to convey fully the scope of the invention to those of ordinary skill in the art.

The term "concrete" refers to cement (which often contains pozzolanic material such as limestone, fly ash, and/or granulated blast furnace slag), aggregates (e.g., sand, gravel), and, optionally, one or more chemical admixtures, e.g., plasticizer for increasing workability and other rheological characteristics, set accelerator, set retarder, air entrainer, air detrainer, plastic shrinkage reducer, corrosion inhibitor (for steel rebar), or other admixtures for modifying a property of the concrete whether in its plastic or hardened state.

When used herein, the phrase "substantially devoid (or empty) of plastic concrete" is best understood in the context of commercial concrete delivery operations. Concrete delivery trucks are not typically used continuously throughout the 24-hour day. The first state of concrete can be described as "before the first load of the day," for there are, at some point, several hours between the last load of a given 24 hour period and a first load of a subsequent 24 hour period. Before the first load of the day, any concrete left over from the previous day is usually in a hardened state (i.e., it does not flow or move when the mixer drum is rotated) and, in this condition, the mixer drum of the concrete delivery truck can fairly be said to contain "zero or negligible amount of plastic" concrete.

An exception to this, however, is when a large dose of retarder is added to the remaining concrete to maintain plasticity of the concrete for use the next day; and, in this case, the mixer drum cannot be considered to be substantially devoid of plastic concrete; because, in such a case, if the amount of retarded concrete is equal to or greater than one (1) cubic yard or more, the amount of plastic concrete can otherwise impede or defeat the ability of methods and systems of the present invention to determine whether hardened concrete buildup in the mixer drum exists and whether it is an unacceptable amount of buildup.

Thus, for purposes of the present invention, the present inventors consider a zero or "negligible amount" of plastic concrete (including any other loose material such as aggregate or loose hardened concrete pieces which have detached from the inner surface of the drum) to be in the range of 0-1.0 (and more preferably 0.0-0.5) cubic yards. This amount is relatively easy to quantify volumetrically and within margin of error for hydraulic sensors currently employed on concrete delivery trucks have load capacity of at least 8 cubic yards or more.

It is preferred that any returned plastic concrete in the mixer drum which has been dosed with retarder to retain plasticity until the next day (or concrete which was not discharged or washed out sufficiently but remains in a workable or flow-able state) should not be greater than 1.0 total cubic yards (and more preferably not greater than 0.5 total cubic yards).

Methods and systems of the present invention may employ equipment, e.g., hydraulic pressure sensors, processors for receiving information from sensors, etc., is commercially available in the concrete delivery industry.

As shown in FIG. 1, an exemplary system of the invention, which may be programed to perform the steps described in the Summary section, comprises a concrete mixer drum 10 having an inner wall 12 and at least two mixing blades (only one shown at 13) mounted on the inner wall 12 within the mixer drum 10, a motor 16 driven by a hydraulic-pressure pump 18, and a first side (20) for charging the motor in a first direction using hydraulic fluid driven by the pump 18, and a second side (21) for returning the hydraulic fluid returned to the pump 18. A first sensor 22 is used for measuring hydraulic pressure on the charge side 20, and second sensor 23 is used for measuring hydraulic pressure on the discharge side 21. A computer processor unit 25 is connected to the sensors 22 and 23 and programed to measure hydraulic pressure as a function of time during successive rotations of the mixer drum 10, and to determine when eccentric of mixer drum behavior meets or exceeds a stored eccentricity threshold value that is stored in processor-accessible memory 30, as will be further explained in detail herein. If the eccentricity calculated based on real time pressure/time data curve is found to meet or exceed the stored eccentricity threshold value (30), the processor 25 is programmed to initiate an alarm, monitor, or other indicator (designated as at 35) to inform the driver, system operator, construction site foreman, manager, or other person, dispatch center, control center, or remote location, that the stored eccentricity threshold value (or limit) was met or exceeded. This will allow the driver or managing person (e.g. quality control manager) to remove the delivery truck from service, so that it can be chipped out, and otherwise substitute another delivery truck.

As summarized above, the hydraulic drive system for concrete mixers consists of a hydraulic pressure pump-motor combination 18/16 to turn the mixer drum 10. The pump 18 is typically driven by a power take-off (PTO) drive shaft from the truck engine (not shown), the output of which can vary based on truck engine speed. The hydraulic motor 16 is a fixed displacement type and contains ports for connecting and/or mounting of pressure sensors 22 and 23. The pressure sensors 22 and 23 could be the same ones used in automated slump monitoring systems which monitor hydraulic pressure for calculating slump or other rheology properties of the concrete load in the drum. To overcome the effect of varying engine speeds and to provide adjustable mixer drum 10 speeds, the pump 18 is preferably a variable displacement type and is used along with a manual or electronic displacement control (not shown).

As mentioned above, the hydraulic motor 16 usually contains two or more ports 22 and 23, which can be called the "charge" and "discharge" ports. (The hydraulic lines are designated as 24 and 26 in FIG. 1). Generally, as the energy to rotate the mixer drum 10 in the "charge" direction increases, the hydraulic pressure on the charge port 22 increases more significantly than the hydraulic pressure on the "discharge" port 23. Conversely, as the energy needed to rotate the mixer drum 10 in the discharge direction increases, the hydraulic pressure on the discharge port 23 increases more significantly than the hydraulic pressure on the charge port 12.

The pump, preferably of a variable displacement type (e.g., one may control speed and/or volume of the pump) moves the fluid, which, in turn, drives the motor. In current truck designs, the flow rate of the hydraulic fluid is, for the most part, influenced by the use of the throttle (gas pedal) of the truck and the displacement volume set for each cylinder stroke. Once these variables are set, the pump will move fluid at a constant rate. The flow rate of the pump controls the speed of the motor, and, in turn, the drum rotation speed. When the mixer drum is substantially empty of concrete and rotating at a constant speed, if the drum has no eccentric buildup the charge pressure will always be higher than the discharge pressure because the motor is nevertheless rotating a heavy mass (as the drum itself weighs nearly two tons or more). However, when the drum has eccentric buildup, then starting with the mass at the bottom of the rotation (closest to the ground) the motor senses an increase in pressure as the mass is lifted upwards because the weight is resisting the action of the motor (gravity is working against the motion of the drum). After the eccentric weight hits its pinnacle at the top of the rotation, the flow from the pump will push the motor in the charge direction at a constant rate but, as the eccentric mass is now falling (gravity is working with the motion of the drum). Since the motor will only go as fast as the flow of the fluid from the pump, the discharge pressure sensor will increase because the motor will not go any faster and therefor is resisting the falling mass.

While it is not necessary to employ an automated concrete rheology monitoring system on the concrete ready-mix delivery truck, it is preferred that one be used for effectuating the method of the present invention where the mixer drum is substantially devoid of plastic concrete (and other movable objects as discussed previously above). The commercially available concrete management systems available from VERIFI LLC, a wholly owned affiliate company of GCP Applied Technologies Inc., 62 Whittemore Avenue, Cambridge, Mass. 02140, are deemed by the present invention to be suitable for carrying out the method and for embodying the systems of the present invention. Automated concrete monitoring systems with equipment processing rotation speed sensing and monitoring are described in U.S. Pat. Nos. 8,118,473; 8,020,431; 8,746,954; 8,989,905; U.S. Ser. No. 13/818,046; 8,491,717; 8,764,273; U.S. Ser. No. 14/052,289 (Published as No. US/2014-0104066-A1), Ser. No. 14/052,310 (Published as No. US/2014-0104972-A1), U.S. Ser. No. 61/979,217 (Published as No. WO2015160610A1), Publication WO 2015/073825A1, and others.

While automated concrete monitoring systems are known for monitoring slump, it will be understood that the present invention is applicable during the monitoring of other rheology parameters including slump, slump flow, yield stress, viscosity, and other rheological parameters. The term "slump" as used in the present specification may alternatively refer to other rheology measurement. It should be understood that the present invention covers the monitoring of other rheology parameters even when "slump" is indicated. U.S. Pat. No. 8,764,272 discloses an automated system for monitoring thixotropy as well as slump, and yield stress of concrete in a mixing drum, while U.S. Pat. No. 8,818,561 discloses a system for monitoring slump flow. Thus, systems for monitoring various rheology properties of plastic (wet, unhardened) concrete can be used for detecting and measuring the hardened concrete buildup in a mixer drum that is substantially devoid (empty) of plastic concrete in accordance to the present invention.

The rotation speed of the mixer drum 10 can be measured preferably using one or more of accelerometer, magnets, or rotary encoders mounted on the mixer drum, such as by using an annular arrangement of magnets passing field effect sensors, or other known means which provide an output signal to the system processor, such as Eaton sensors. An exemplary speed sensing device is a gyroscopic rotational monitoring system taught in International Publication No. WO 2015/073825A1 of Richard Jordan et al., owned by the common assignee hereof, as previously string-cited above. A gyroscope-bearing monitoring system is commercially available from Verifi LLC of Cambridge, Mass., USA.

Further exemplary embodiments of the present invention comprise the use of a gyroscope, preferably in combination with an accelerometer, as a sensor for determining drum rotation states such as rotational speed.

FIGS. 2-10 are graphic illustrations of hydraulic pressure monitoring, using sensors on the charge and discharge side (e.g., at charge and discharge ports on the hydraulic motor of the concrete delivery truck). These illustrations graphically demonstrate the effect of negligible and non-negligible (appreciable) hardened concrete buildup in the drum, will be described in the Examples later in this section.

As summarized above, an exemplary method for detecting buildup of hardened concrete in a mixer drum, comprises: (a) providing a rotatable concrete mixer drum 10 having an inner wall 12 and at least two blades (as designated for example at 13) mounted on the inner wall 12 within the mixer drum 10, the mixer drum 10 having 0.0-1.0 (more preferably 0.0-0.5) cubic yard of plastic cementitious material and loose material which is unattached to the mixer drum 10 (hereinafter described as "mixer drum having zero or negligible load"), the concrete mixer drum 10 having zero or negligible load being rotated at a constant rotational speed by a motor 16 driven by a hydraulic-pressure pump 18, the motor 16 having a first side 20 for charging the motor 16 in a first direction using hydraulic fluid driven by the pump 18 and a second side 21 for returning hydraulic fluid to the pump 18; (b) measuring the hydraulic pressure as a function of time during at least two successive complete rotations (≥720 degrees of rotation) of the mixer drum 10 having zero or negligible load at constant rotational speed (preferably <1.0 RPM, and more preferably <0.5 RPM) using a sensor 22 for measuring the pressure of the hydraulic fluid at the first side 20, a sensor 23 for measuring the pressure of the hydraulic fluid on the second side 21, or (more preferably) sensors on both sides, to obtain a pressure/time data curve; (c) determining when the sensed pressure/time data curve as obtained from step (b) displays eccentric behavior which meets or exceeds a stored eccentricity threshold (as designated at 30 in FIG. 1); and, where eccentric behavior is found to meet or exceed a stored eccentricity threshold (or limit); (d) providing an alarm or indication threshold (as designated at 35 in FIG. 1) that the mixer drum has attained or exceed the stored eccentricity threshold (or limit).

The alarm or indication 35 may, in exemplary embodiments of the invention, comprise: (i) a visual indication or display (such as a monitor or visual alarm indicating to a driver of a vehicle upon which the concrete mixer drum is mounted) that hardened concrete buildup is detected; (ii) a notification (e.g. to the concrete plant manager) that hardened concrete buildup has exceeded a threshold limit; (iii) a notification to the concrete quality control manager or operations manager that buildup has been detected, and, optionally, the amount of buildup that is detected. For example, the alarm or indication may be in the form of a smart phone monitor. Alternative, a monitor display in the truck cab can be used to provide a visual alarm or graphic or other visual indication of the existence or amount of buildup that is detected.

As previously discussed, exemplary methods and systems of the invention will function best if the mixer drum is substantially devoid of plastic concrete and any other loose material. The "substantially devoid" means that the mixer drum contains 0.0 to 1.0 (and more preferably 0.0 to 0.5) cubic yards of sand aggregate, coarse stone aggregate, or loose hardened concrete that is not attached to an inner surface of the mixer drum; and, more preferably, there will be no plastic concrete or other loose material within of the mixer drum.

The system and method of the invention will then most accurately detect the presence and even the amount, of buildup inside the mixer drum. The present inventors believe that at least three different exemplary procedures can be employed to determine if eccentricity of mixer drum behavior exists, and, optionally, the amount of eccentricity which could be correlated to the amount of buildup in the drum: (A) the first and most preferred procedure involves measuring the amplitude of the sensed hydraulic pressure at the charge side, at the discharge side, or at both the charge and discharge sides; (B) a second procedure involves comparing the hydraulic pressure over a complete drum rotation at the charge side to the hydraulic pressure over the same complete drum rotation at the discharge side; and (C) a third procedure involves calculating the ratio between the second moment of area with respect to the x and y-axes of the shape created by plotting the hydraulic pressure over a complete drum rotation at the charge side in polar coordinates where the pressure represents the distance from the pole (center of graph) and the angle of drum rotation represents the angular coordinate or measuring the centroid of the shape created by plotting the hydraulic pressure over a complete drum rotation at the discharge side in polar coordinates where the pressure represents the distance from the pole and the angle of drum rotation represents the angular coordinate.

With respect to the first procedure A, "amplitude" can be defined in a number of ways. As the pressure sensor signal will generate some noise (spurious data), which can be visualized as jaggedness in the sine wave in graphic illustrations of the hydraulic pressure value (see e.g. FIGS. 2 and 4), it is less preferable to use an "absolute" value, i.e. the maximum and minimum of the sine wave (See e.g., FIG. 2-5), because the noise can have unwanted influence on these values. It is more preferable to use values that might represent, for example, the 5th and 95th percentages of hydraulic pressure values (e.g. averaged) over the span of one complete drum rotation; these values are less likely to be skewed by noise. Hence, the term "amplitude" as used herein can refer to any measure of the height of a sine wave, whether that measure is "absolute" or not. It is a preference of the user or system programmed to select the desired or appropriate method for determine the amplitude.

In still further embodiments, as particularly described for procedure B, eccentricity of the mixer drum can be evaluated based upon comparing the hydraulic pressure over a complete drum rotation at the charge side to the hydraulic pressure over the same complete drum rotation at the discharge side. As discussed further in the Examples provided at the end of this section, the processor can be programmed to detect when the hydraulic pressure values as sensed at the charge side intersects or overlaps the hydraulic pressure values as sensed at the discharge side (compare FIG. 4 of a "clean" drum and FIG. 5 of a drum with appreciable buildup). The occurrence of an intersection or overlap between charge and discharge pressure can be used by the system process to initiate an alarm or indication that hardened concrete buildup has occurred and should be removed.

Figure 4:
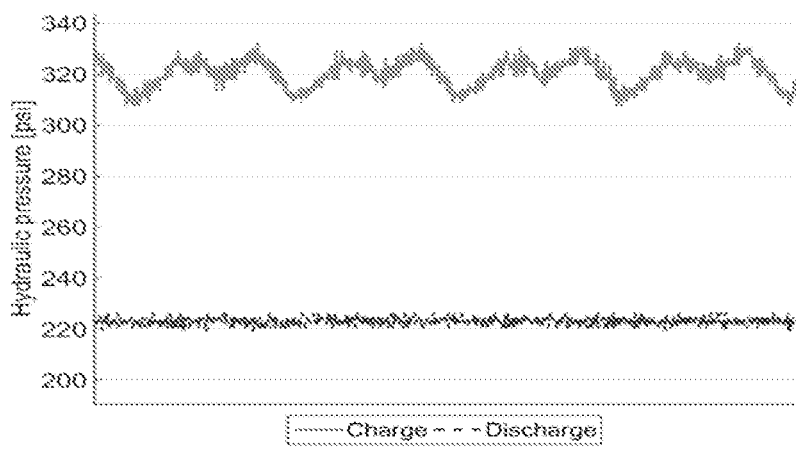
FIG. 4 is a graphic illustration of hydraulic charge pressure (data curve shown in continuous line in top of graph) and hydraulic discharge pressure (data curve shown in dotted line in bottom of graph) over time during sequential rotations at 2 RPM of a mixer drum having no plastic concrete (or other loose material) and negligible hardened concrete buildup.
Figure 5:
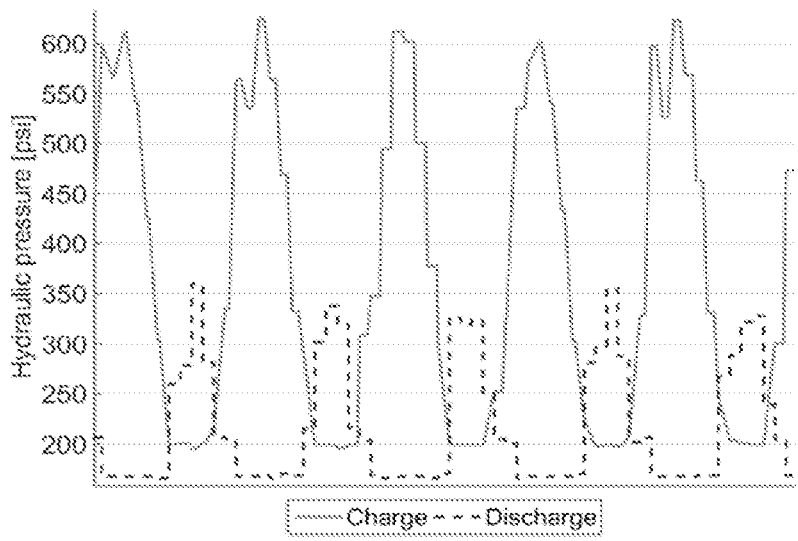
FIG. 5 is a graphic illustration of hydraulic charge pressure (data curve shown in continuous line which extends to top of graph) and hydraulic discharge pressure (data curve shown in dotted line) over time during successive rotations at 2 RPM of a mixer drum that is substantially devoid (empty) of plastic concrete (and devoid of other loose material) but has appreciable amount of hardened concrete buildup, wherein the charge and discharge pressure data curves intersect (overlap) at various points.

In further exemplary embodiments which use procedure B for determining eccentricity of drum rotation, the processor may be programmed to determine that eccentricity exists when the average or peak hydraulic pressure sensed for the charge and discharge pressures come within a pre-established distance of each other (e.g., somewhere between the distant and overlapping graphs shown in FIGS. 4 and 5).

As mentioned above for procedure C, eccentricity of mixer drum behavior can be determined based upon calculating the ratio between the second moment of area about both the x and y-axes of the shape created by plotting the hydraulic pressure over a complete drum rotation at the charge side in polar coordinates where the pressure represents the distance from the pole and the angle of drum rotation represents the angular coordinate or calculating the ratio between the second moment of area about both the x and y-axes of the shape created by plotting the hydraulic pressure over a complete drum rotation at the discharge side in polar coordinates where hydraulic pressure is represented or measurable as the distance from the pole and the angle of drum rotation represents the angular coordinate. A standard concept in physics, the second moment of area is calculated as: $I_x = \iint_R x^2 dA$, and $I_y = \iint_R y^2 dA$ where Ix is the second moment of area about the x-axis, Iy is the second moment of area about the y-axis, A is the area of the shape, R. (See e.g., FIGS. 6-7).

In still further exemplary embodiments, the processor is programmed, upon determining that eccentricity (buildup) in the mixer drum is unacceptable to actuate an alarm or indication, such as a graphic representation, number, or other indication of the amount of the hardened concrete buildup detected in the drum. This can be done by empirically correlating various amounts of hardened concrete buildup with the associated hydraulic pressure/time data curves, and storing these correlations into processor accessible memory, so that when pressure/time data is generated over drum rotations in real time this can be compared to stored pressure/time curves, and the associated buildup amount can be displayed by monitor or laptop or smart phone screen, for example. The amount of concrete buildup would be determined by chipping out the truck and determining the volume of this buildup.

In further exemplary embodiments of the invention, the determination of eccentricity of the (empty) mixer drum, whereby the pressure/time data curves are obtained, is preferably done by rotating the drum at a constant speed that exceeds 50% and more preferably exceeds 90% of the maximum drum rotation speed.

In still further exemplary embodiments of the invention, wherein returned plastic concrete is dumped from the mixer drum, it is preferable to introduce one or more set retarding admixture chemicals into the mixer drum, after the plastic concrete has been removed, to help maintain the healthy status of the drum. In still further exemplary embodiments, the processor is programmed to indicate on a visual display, such as a laptop screen monitor, smart phone screen, or other monitor, the amount of hardened concrete buildup in the mixer drum as a function of time, such as between "cleanings" of the truck.

Figure 11:
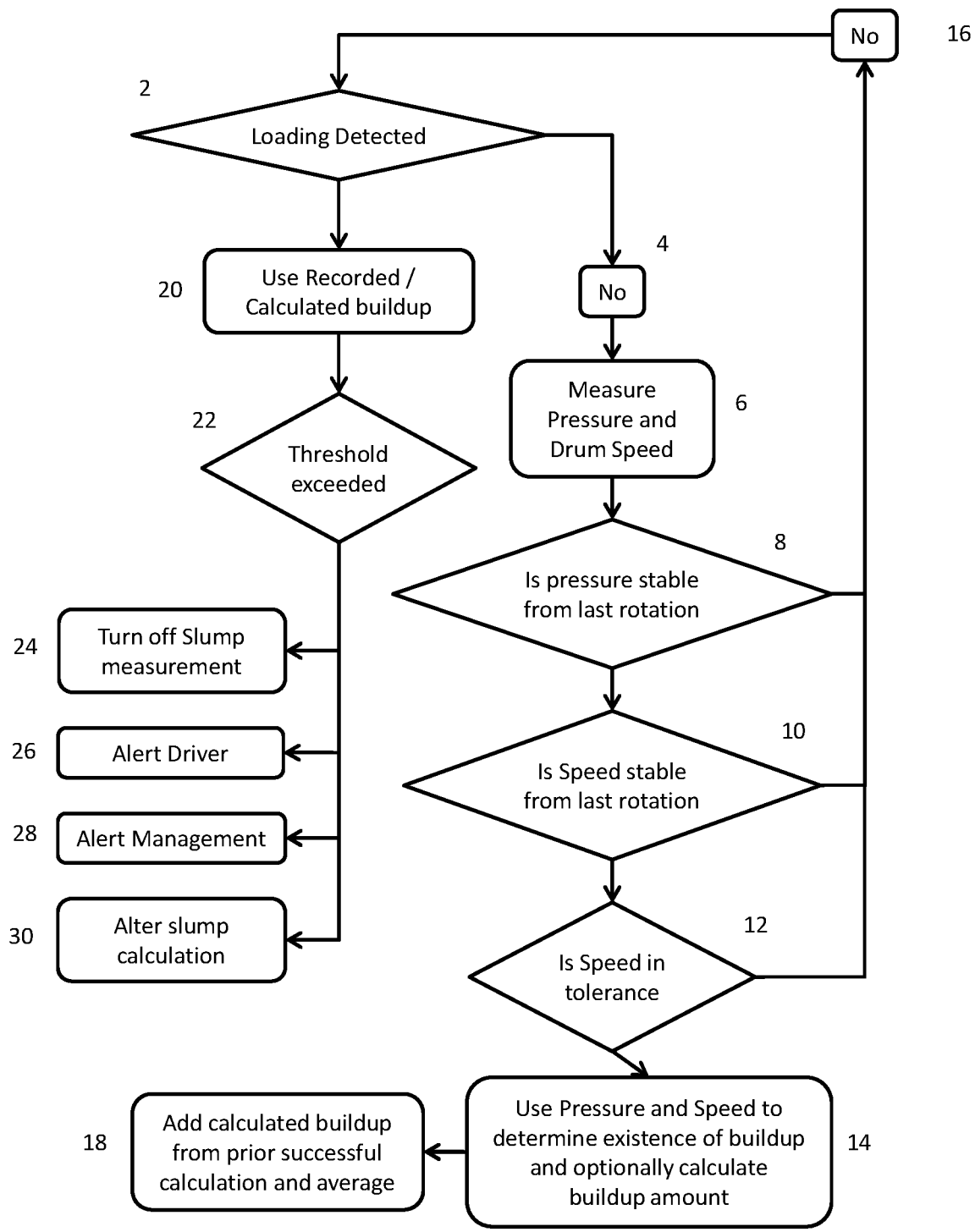
FIG. 11 is a chart that outlines exemplary steps for determining and reporting buildup in the mixer drum (which is substantially devoid of plastic concrete and other loose material).

FIG. 11 illustrates in flow chart fashion how the system processor or is programmed to determine the extent of eccentric mixer drum behavior. The process first may determine, based on amount of hydraulic pressure required to rotate the drum, whether the drum is loaded (2). If no loading is detected (4), the processor then measures hydraulic pressure and drum speed over successive drum rotations (6). If pressure is stable across the latest drum rotation cycles (8), and drum speed is stable across the latest rotation (10) and within a certain speed tolerance (12), then hydraulic pressure and drum speed values (as obtained from sensors) is used by the processor to determine the existence and optionally the amount of the eccentricity or buildup (14).

This eccentricity or buildup amount may be averaged with previously obtained values from prior deliveries (obtained while truck is empty) or previously obtained values (pre-loading) for the current delivery (18).

If a loading event has been detected (2), the system processor uses the last calculated buildup value obtained (pre-loaded state) from a prior delivery (20) and compares it to a threshold to see if the threshold is exceeded (22). If the threshold is exceeded in 22, then one of the following can occur: turn off the slump measurement (24) where a slump monitoring is used on the truck, alert the driver (26), alert a manager (e.g. plant operations manager or quality control) (28), alter or modify the slump calculation (30) where a slump monitoring system is used with the invention, or a combination thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

Example 1

Figure 2:
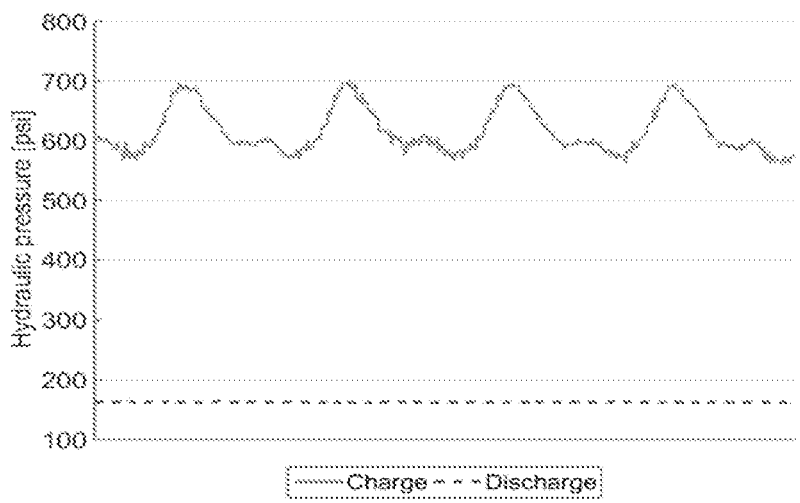
FIG. 2 is a graphic illustration of hydraulic charge pressure (data curve shown at top in continuous line at top of graph) and hydraulic discharge pressure (data curve shown on bottom of graph in dashed line) over time during successive rotations at 2 rotations per minute (RPM) of a concrete mixer drum having negligible hardened concrete buildup and 8 cubic yards of plastic concrete.
Figure 3:
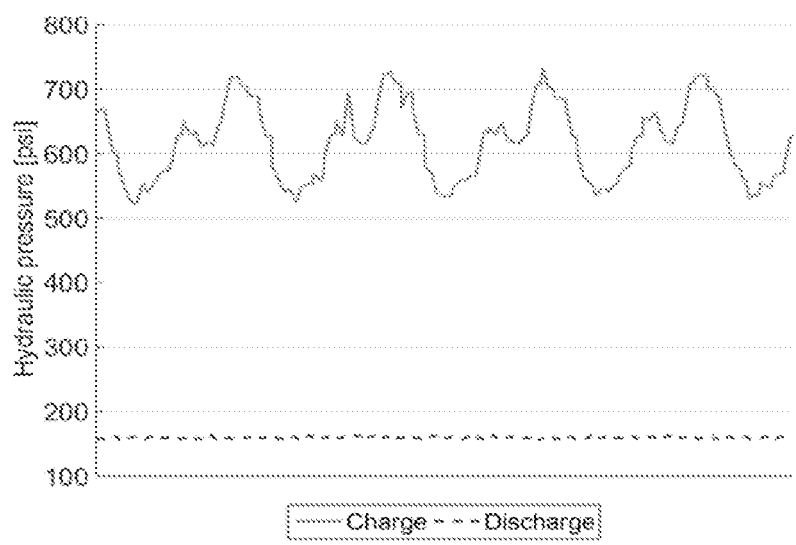
FIG. 3 is a graphic illustration of hydraulic charge pressure (data curve shown at top in continuous line at top of graph) and discharge pressure (data curve shown on bottom of graph in dashed line) over time during sequential rotations at 2 RPM of a concrete mixer drum having hardened concrete buildup and containing no plastic concrete.

In this example, two rotating mixer drums, both having (eight) 8 cubic yards of concrete, are rotated at a constant speed of 2 revolutions per minute (RPM), and charge and discharge pressure over time for approximately four revolutions is compared in FIGS. 2 and 3.

In FIG. 2, the pressure/time behavior of a drum having negligible buildup is seen; while in FIG. 3, the drum has an appreciable buildup.

The variation of the charge pressures for FIGS. 2 and 3 are ±60 pounds per square inch (PSI) and ±100 (PSI) respectively. The difference between the variations of the charge pressures can be difficult to detect when including other factors (e.g. drum configuration, mix proportions). The variation of the discharge pressures for FIGS. 2 and 3 are both around ±5 PSI.

Although buildup status is significantly different between the two drums, a comparison of the variation of a revolution, such as amplitude, may not always provide a clear indication of the existence or extent of buildup.

In addition, both figures clearly show a separation between the charge and discharge pressures, i.e., there is no intersection between the two signals. As a result, when the drum is not substantially devoid of concrete, it can be difficult to infer buildup based on the hydraulic pressure signals.

Example 2

In this example, two rotating mixer drums, which are both substantially devoid of plastic concrete, are rotated at constant speeds of 2 RPM over four revolutions, and compared in FIGS. 4 and 5.

FIG. 4 illustrates negligible buildup in the drum, while FIG. 5 illustrates appreciable buildup in the drum. The variation of the charge pressures for FIGS. 4 and 5 are ±20 PSI and ±200 PSI respectively. Furthermore, the variation of the discharge pressures for FIGS. 4 and 5 are ±5 PSI and ±100 PSI. These are much larger differences between the variations, compared to Example 1. While FIG. 4 shows no intersection between the charge and discharge pressures, FIG. 5 shows two intersections (and overlap) between the charge and discharge pressure within each complete drum rotation. When the drum is not substantially devoid of concrete, the impact of buildup on the hydraulic pressure signals becomes clear.

Example 3

As a hypothetical example, a system can be programmed to run through the following steps. First, the amplitude of the discharge pressure is measured (the peak minus the trough over successive drum revolutions). In Example 1, where the drum has negligible buildup, this would be calculated as 5 PSI; while, in Example 2, where the drum has appreciable buildup, this would be calculated as 100 PSI. This value would then be compared to a pre-stored threshold value, which may depend on the truck type. If this value is set as 10 PSI and store in processor accessible memory, the operator and other entities would be alerted by the system processor to the existence of buildup for Example 2, but not for Example 1.

As a further exemplary embodiment, the comparison of the charge and discharge pressure can be used as an alternative to the amplitude measurement procedure. In Example 1, again using a drum with negligible buildup, the charge pressure minus the discharge pressure would result in a value greater than 0 PSI across each successive rotation. However, in Example 2, a drum with appreciable buildup, there occurs times in each rotation where the discharge pressure is greater than the charge pressure. As a result, the charge pressure minus the discharge pressure would consistently yield values less than 0 PSI at some point for each rotation. For this case, buildup could be signified if at any point in the rotation, the difference of the charge pressure minus the discharge pressure is less than 0 PSI.

In other exemplary embodiments, the threshold could be a larger number, such as 50 PSI. The smallest different between charge and discharge pressure for Example 1 is 85 PSI, which would not set off an alarm, while in Example 2, the smallest different would be −150 PSI, which is less than the threshold, 85 PSI, thus setting off an alarm for excess buildup.

Example 4

The pressure/time data obtained from the two drums described in Example 2 above can provide valuable insights when plotted using a polar coordinate system. When plotted using a polar coordinate system, the pressure value over one drum rotation can be visualized with respect to the angle of the drum rotation. If a frame of reference can be correlated with physical orientation of the mixer drum circumference, FIGS. 6 and 7 suggest where the cycles of hydraulic pressure occur.

Figure 6:
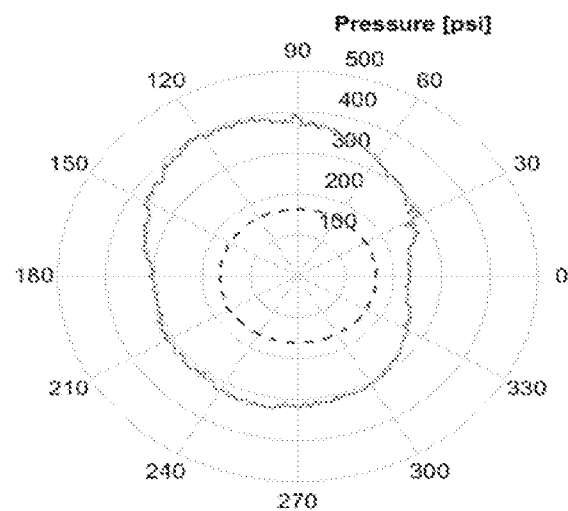
FIG. 6 is a graphic circular illustration of hydraulic charge pressure (data curve shown in continuous line) and hydraulic discharge pressure (data curve shown in dotted line) during a complete 360 degree rotation (at 2 RPM) of a mixer drum that is devoid of plastic concrete (or any other loose material) and has negligible hardened concrete buildup, wherein the charge and discharge pressure data curves do not intersect, and the charge pressure data curve is fairly symmetrical about the center (e.g., it can be said to be "non-eccentric")
Figure 7:
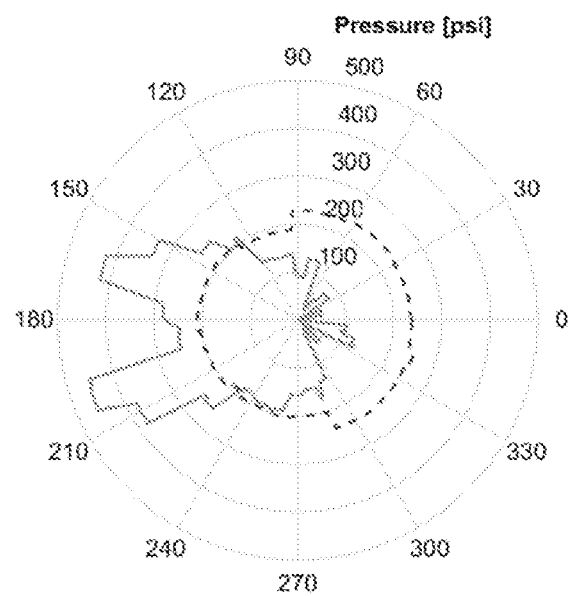
FIG. 7 is a graphic circular illustration of hydraulic charge pressure (data curve shown in continuous line) and hydraulic discharge pressure (data curve shown in dotted line) during a complete 360 degree rotation (at 2 RPM) of a mixer drum that is devoid of plastic concrete (or any other loose material) but has appreciable amount of hardened concrete buildup, wherein the charge and discharge pressure data curves intersect (and overlap), and furthermore wherein the charge pressure data curve is highly asymmetrical with respect to the center of the circular graph (e.g., it can be said to be "eccentric")

As stated in Example 2, both drums are substantially devoid of plastic concrete and are rotating at 2 RPM. FIG. 6 shows a drum with negligible buildup, while FIG. 7 shows a drum with appreciable buildup. In FIG. 6, again, there is no intersection between the charge and discharge pressures. However, in FIG. 7, the intersections between the charge and discharge pressures are clearly identified. Furthermore, the drum that does not have buildup displays a more symmetric (or concentered) circular graph compared to the drum that has buildup. In one exemplary embodiment, this can be quantified by comparing the second moment of area for the x and y directions. The second moment of area is calculated as: $I_x = \iint_R x^2 dA$, and $I_y = \iint_R y^2 dA$ where Ix is the second moment of area about the x-axis, Iy is the second moment of area about the y-axis, A is the area of the shape, R. Using these equations, one can calculate the ratio between Ix and Iy, which, for Example 1, is Ix/Iy=0.71 while for Example 2 is Ix/Iy=6.1. This is a significant difference in the ratios of the second moment of areas.

More specifically, Example 1 is closer to unity (1) than Example 2. Physically, this means that the drum with buildup is experience a higher eccentric pressure distribution over a revolution than for the drum without buildup.

In further exemplary methods and systems of the present invention, a visual display is used to illustrate the amount and respective location within the drum of hardened concrete buildup. Preferably, this is done using polar coordinates.

Example 5

As another hypothetical example, a system can also be programmed to run through the following steps. First, the charge pressure over successive revolutions can be plotted in polar coordinates, where the pole is zero pressure, and the angular value represents the drum angle over one revolution. The ratio between the second moments of inertias with respect to both the x and y axis for each successive rotation can be calculated for the enclosed shape. In Example 1, the ratio is 0.71, whereas the ratio is 6.1 for example 2. These ratios can be compared to a pre-stored threshold, which again may depend on truck type. A hypothetical threshold condition could be that if the ratio is within the range 0.5 and 1.5, buildup is assumed to be negligible. If, however, the ratio is less than 0.5 or more than 1.5, than the operator and other entities would be alerted to the existence of buildup. Using such a condition, buildup is alerted for Example 2, but not for Example 1.

Example 6

In this example, two rotating drums, initially devoid of plastic concrete, are loaded with aggregate, water and cement. Both the charge and discharge pressures, along with the drum speed, are plotted in FIGS. 8 and 9.

Figure 8:
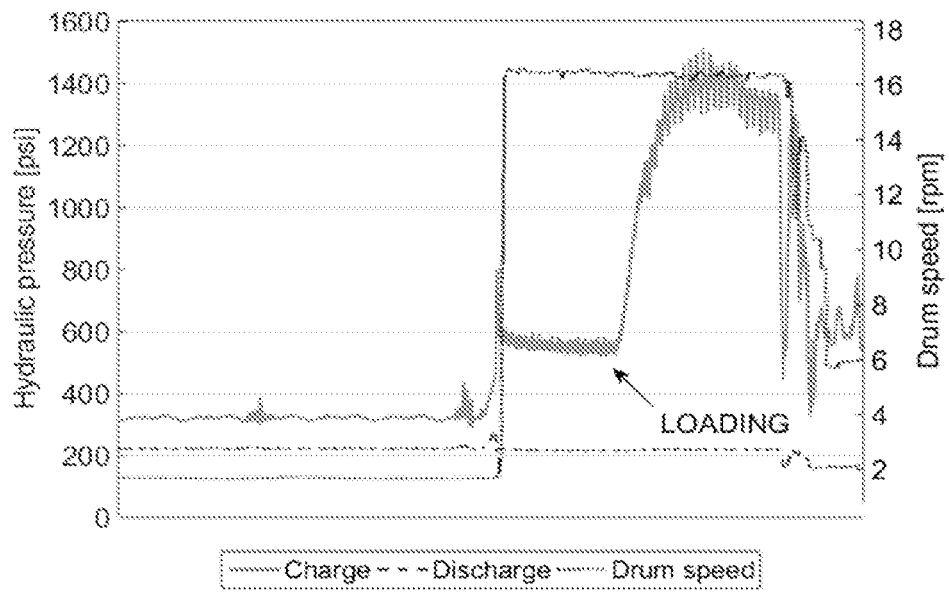
FIG. 8 is a graphic illustration of hydraulic pressure at the charge and discharge sides during a loading event, wherein the rotating concrete drum has negligible amount of hardened concrete buildup and is initially empty of plastic concrete, but is then loaded with aggregate, cement, and water for making a concrete batch, the graph showing relatively little variation in pressure at the discharge side (±5 pounds per square inch (PSI)) before and after drum speed is increased from about 2 RPM to 16 RPM and also before and after loading.
Figure 9:
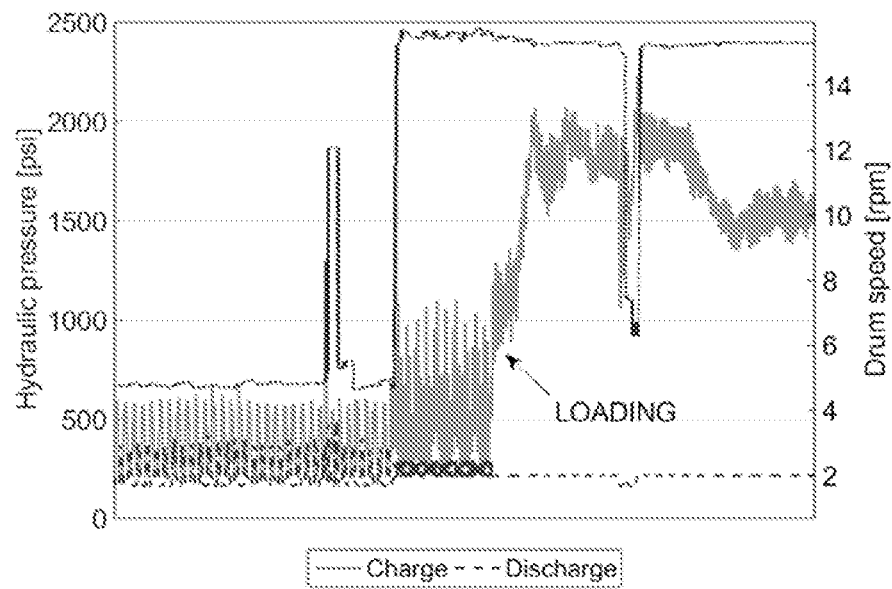
FIG. 9 is a graphic illustration of hydraulic pressure at the charge and discharge sides during a loading event wherein the drum has appreciable hardened concrete buildup and is initially empty of plastic concrete; but, after loading with aggregate, cement, and water, dramatic variations in hydraulic pressure are shown to occur after mixer drum speed is increased from 2 RPM to about 15 RPM and also before and after loading.

FIG. 8 shows the pressure against speed of a drum having negligible buildup, while Fig. shows pressure against peed of a drum having appreciable buildup. In FIG. 8, it can be seen that the variation of the discharge pressure is around ±5 PSI for the entire time and does not change during the speed change from 2 to 16 RPM; nor does it change during the loading event. On the other hand, in FIG. 9, the variation of the discharge pressure is around ±125 pounds per square inch (PSI) at a speed of 5 RPM and drops to ±40 PSI when the drum rotation speed increases to 15 RPM. Furthermore, during the loading event, the variation in the discharge pressure drops again to ±5 PSI, the same as for the drum with negligible buildup.

This demonstrates the ability of the present invention to detect buildup during both speed changes and loading events.

Example 7

In this example, a relationship was developed between the amount of buildup chipped out of a truck and the difference between the maximum and minimum charge pressure at high speed for different empty mixer drums containing different amounts of buildup.

Figure 10:
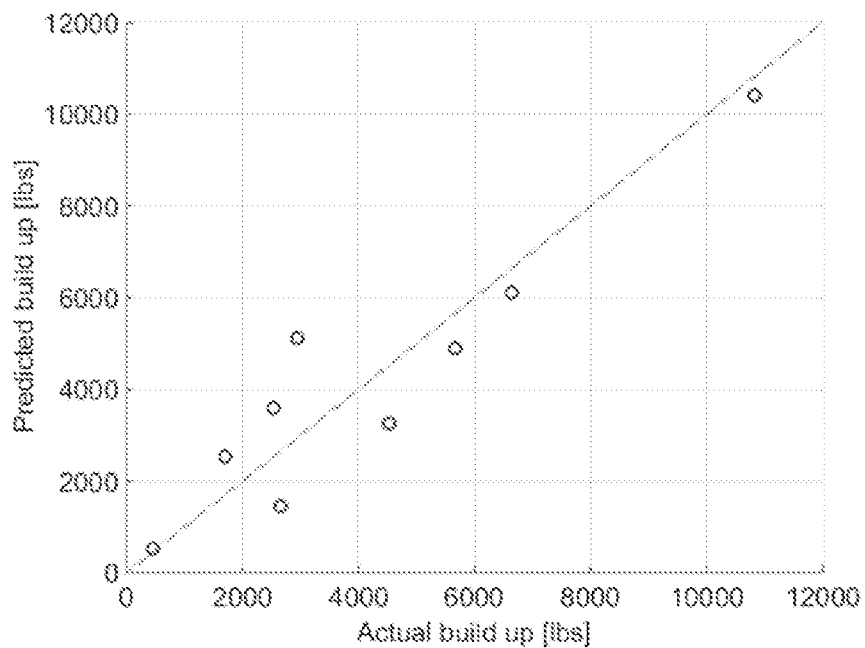
FIG. 10 is a graphic illustration of predicted hardened concrete buildup drum based on the amplitude of the hydraulic pressure measured on the charge side when the drum is substantially devoid of plastic concrete (at 10-20 RPM), and compared to actual buildup as measured after the drum is chipped out to remove the buildup.

The relationship was then applied to empty drum signals, with the results plotted in FIG. 10. As can been seen, the points fall close to the line wherein predicted buildup is identical to actual buildup.

The present invention is described herein using a limited number of illustrative embodiments not intended to limit the scope of the invention as otherwise described and claimed herein. Modifications and variations from the described embodiments can exist. It should be understood that the invention is not limited to the specific details set forth above.

What is claimed is:

1. A method for detecting buildup of hardened concrete in a mixer drum, comprising:
   (a) providing a rotatable concrete mixer drum having an inner wall and at least two blades mounted on the inner wall within the mixer drum, the mixer drum having 0.0-1.0 cubic yard of plastic cementitious material and material unattached to the mixer drum (hereinafter described as "mixer drum having zero or negligible load"), the concrete mixer drum having zero or negligible load being rotated at a constant rotational speed by a motor driven by a hydraulic-pressure pump, the motor having two sides, a first side for charging the motor in a first direction using hydraulic fluid driven by the pump and a second side for returning the hydraulic fluid to the pump;
   (b) measuring the hydraulic pressure as a function of time during at least two successive complete rotations of the mixer drum having zero or negligible load at constant rotational speed using sensors on both first and second sides to obtain a pressure/time data curve;
   (c) determining when the sensed pressure/time data curve as obtained from step (b) represents eccentric behavior which meets or exceeds a stored eccentricity threshold, the determination of eccentric behavior being accomplished by comparing the hydraulic pressure over a complete drum rotation at the charge side to the hydraulic pressure over the same complete drum rotation at the discharge side; and, where eccentric behavior is determined to meet or to exceed the stored eccentricity threshold;
   (d) providing an alarm or indication that the rotation of the concrete drum has eccentric behavior which meets or exceeds the stored eccentricity threshold.

2. The method of claim 1 wherein, in step (c), eccentricity is determined based upon at least one of the following procedures:
   A. measuring the amplitude of the sensed hydraulic pressure at both the charge and discharge sides; or
   B. calculating the ratio between the second moment of area about both the x and y-axes for the shape created by plotting the hydraulic pressure over a complete drum rotation at the charge side in polar coordinates where the pressure represents the distance from the pole and the angle of drum rotation represents the angular coordinate or measuring the centroid of the shape created by plotting the hydraulic pressure over a complete drum rotation at the discharge side in polar coordinates where the pressure represents the distance from the pole and the angle of drum rotation represents the angular coordinate.

3. The method of claim 2 wherein eccentricity of mixer drum behavior is determined based upon measuring the amplitude of the sensed hydraulic pressure at both the charge and discharge sides.

4. The method of claim 3 wherein the amplitude is calculated as the absolute difference between the maximum and minimum values of the hydraulic pressure over time at the charge side or the amplitude is calculated as the absolute difference between the maximum and minimum values of the hydraulic pressure over time at the discharge side.

5. The method of claim 2 wherein eccentricity of mixer drum behavior is determined by calculating the ratio between the second moment of areas about both the x and y-axes of the shape created by plotting the hydraulic pressure over a complete drum rotation at the charge side in polar coordinates where the pressure represents the distance from the pole and the angle of drum rotation represents the angular coordinate or measuring the centroid of the shape created by plotting the hydraulic pressure over a complete drum rotation at the discharge side in polar coordinates where the pressure represents the distance from the pole and the angle of drum rotation represents the angular coordinate.

6. The method of claim 1 wherein, in step (d), the alarm or indication comprises: (i) a visual indication or display indicating to a driver of a vehicle upon which the concrete mixer drum is mounted that hardened concrete buildup is detected; (ii) a notification to a concrete plant manager that hardened concrete buildup has exceeded the eccentricity threshold; (iii) a notification to a concrete quality control manager that buildup has exceeded the eccentricity threshold; or (iv) a combination of any of the foregoing.

7. The method of claim 2 wherein, in procedure A, the amplitude is calculated as the absolute difference between the maximum and minimum values of the hydraulic pressure over drum rotation at the charge side or the amplitude is calculated as the absolute difference between the maximum and minimum values of the hydraulic pressure over drum rotation at the discharge side.

8. The method of claim 2 wherein, in procedure A, the amount of buildup is determined by comparing the measured amplitude to a previously stored data curve that derived from buildup amount data and amplitude data.

9. The method of claim 2 wherein, in procedure B, the comparison between the hydraulic pressure over a complete drum rotation at the charge and discharge sides is quantified by the difference between hydraulic pressure over a complete drum rotation at the charge and discharge sides.

10. The method of claim 2 wherein, in procedure B, the amount of hardened concrete buildup is calculated by comparing the difference between the hydraulic pressure at the charge side and the hydraulic pressure at the discharge side to a previously stored data curve that contains buildup amount data and the difference between the hydraulic pressure at the charge side and the hydraulic pressure at the discharge side.

11. The method of claim 2 wherein, in procedure C, the buildup is quantified by comparing the ratio between the second moment of areas about both the x and y-axes of the shape created by plotting the hydraulic pressure over a complete drum rotation at the charge port in polar coordinates where the pressure represents the distance from the pole and the angle of drum rotation represents the angular coordinate and the pole to a previously stored data curve that relates buildup amount and the ratio between the second moment of areas about both the x and y-axes of the shape created by plotting the hydraulic pressure over a complete drum rotation at the charge side in polar coordinates where hydraulic pressure represents the distance from the pole and the angle of drum rotation represents the angular coordinate.

12. The method of claim 1 wherein, in step (d), the indication is of the amount of hardened concrete buildup.

13. The method of claim 1 wherein, in step (b), the drum is rotated at a constant speed that exceeds 50% of the maximum drum rotation speed.

14. The method of claim 1 wherein, in steps (a) and (b), the drum is rotated at a constant speed that exceeds 90% of the maximum drum rotation speed.

15. The method of claim 1 further comprising introducing at least one set retarding admixture chemical into the mixer drum after plastic concrete has been removed from the drum.

16. The method of claim 1 wherein the processor is programmed to indicate on a visual display the amount of hardened concrete buildup in the mixer drum as a function of time.

17. A concrete mixer drum monitoring system comprising: a computer processor programmed to perform the method of claim 1.

* * * * *